(12) United States Patent
Mito et al.

(10) Patent No.: US 11,408,307 B2
(45) Date of Patent: Aug. 9, 2022

(54) GAS TURBINE

(71) Applicant: Mitsubishi Hitachi Power Systems, Ltd., Kanagawa (JP)

(72) Inventors: Ryosuke Mito, Tokyo (JP); Hidetaka Okui, Yokohama (JP); Shinya Hashimoto, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 140 days.

(21) Appl. No.: 16/498,017

(22) PCT Filed: Mar. 30, 2018

(86) PCT No.: PCT/JP2018/013616
§ 371 (c)(1),
(2) Date: Sep. 26, 2019

(87) PCT Pub. No.: WO2018/181902
PCT Pub. Date: Oct. 4, 2018

(65) Prior Publication Data
US 2020/0056508 A1 Feb. 20, 2020

(30) Foreign Application Priority Data
Mar. 30, 2017 (JP) .............................. JP2017-066598

(51) Int. Cl.
*F01D 25/30* (2006.01)
*F01D 25/24* (2006.01)
*F01D 9/02* (2006.01)

(52) U.S. Cl.
CPC ............... *F01D 25/30* (2013.01); *F01D 9/02* (2013.01); *F01D 25/24* (2013.01);
(Continued)

(58) Field of Classification Search
CPC . F01D 25/24; F01D 25/30; F01D 9/02; F05D 2240/128; F05D 2240/35;
(Continued)

(56) References Cited

U.S. PATENT DOCUMENTS 5,592,821 A   1/1997  Alary et al.
7,600,370 B2 * 10/2009  Dawson ................. F01D 9/023
                                                        60/39.37
(Continued)

FOREIGN PATENT DOCUMENTS

JP          2000-314397        11/2000
JP          2003-42451         2/2003
(Continued)

OTHER PUBLICATIONS

International Search Report dated Jun. 19, 2018 in International (PCT) Patent Application No. PCT/JP2018/013616, with English Translation.

(Continued)

*Primary Examiner* — Loren C Edwards
(74) *Attorney, Agent, or Firm* — Wenderoth, Lind & Ponack, L.L.P.

(57) ABSTRACT

The present invention includes a flow guide (17) that is disposed in a space (15A) formed in a casing, on an outlet side of a diffuser (14), the flow guide including: a first guide surface (17a) that is disposed on a rotor side provided to a compressor and a gas turbine, and that delays turning of a flow direction of a compressed gas which has passed through the diffuser (14); and a second guide surface (17b) that is disposed outside the first guide surface (17a) and that turns the flow direction of the compressed gas which has passed through the diffuser (14).

6 Claims, 6 Drawing Sheets

(52) U.S. Cl.
CPC .... *F05D 2240/128* (2013.01); *F05D 2240/35* (2013.01); *F05D 2250/52* (2013.01); *F05D 2260/60* (2013.01)

(58) Field of Classification Search
CPC .. F05D 2250/52; F05D 2260/60; F04D 29/54; F04D 29/547; F02C 7/00
See application file for complete search history.

(56) References Cited

U.S. PATENT DOCUMENTS

| | | | |
|---|---|---|---|
| 2003/0010014 A1* | 1/2003 | Bland | F01D 9/06 60/39.37 |
| 2007/0119145 A1 | 5/2007 | O'Neill et al. | |
| 2007/0271923 A1* | 11/2007 | Dawson | F01D 9/023 60/751 |
| 2010/0239418 A1 | 9/2010 | Schott et al. | |
| 2012/0027578 A1 | 2/2012 | Nanda | |
| 2019/0003487 A1* | 1/2019 | Terauchi | F23R 3/60 |

FOREIGN PATENT DOCUMENTS

| | | |
|---|---|---|
| JP | 2007-146838 | 6/2007 |
| JP | 2010-223223 | 10/2010 |
| JP | 2012-31855 | 2/2012 |
| JP | 2015-137607 | 7/2015 |

OTHER PUBLICATIONS

Written Opinion of the International Searching Authority dated Jun. 19, 2018 in International (PCT) Patent Application No. PCT/JP2018/013616, with English Translation.

* cited by examiner

GAS TURBINE

TECHNICAL FIELD

The present invention relates to a gas turbine.

Priority is claimed on Japanese Patent Application No. 2017-066598, filed Mar. 30, 2017, the contents of which are incorporated herein by reference.

BACKGROUND ART

A gas turbine has a compressor, a combustor accommodated in a casing, a diffuser, and a turbine.

The compressor generates compressed air. The generated compressed air is supplied to a space in the casing.

The combustor generates combustion gas using the compressed air. The turbine rotates a rotor with the combustion gas.

The diffuser connects an outlet of the compressor and an entrance side of the casing. A flow path whose cross-sectional area gradually increases from the compressor toward the casing is defined in the diffuser. The diffuser converts a dynamic pressure of the compressed air into a static pressure.

The dynamic pressure of the compressed air is preferably converted into the static pressure by the diffuser as much as possible. However, if an angle of a circumferential wall of the diffuser becomes too large with respect to a main flow of the compressed air, a boundary layer may be separated from an inner wall surface of the diffuser. When such separation of the compressed air occurs, pressure loss increases and efficiency of the entire gas turbine decreases.

In addition, a flow rate distribution (in other words, a pressure distribution) in a radial direction of a rotating shaft of the gas turbine is formed in the compressed air flowing into the flow path in the diffuser. For this reason, the separation of the compressed air easily occurs on an inner surface side of the flow path in the diffuser. Thus, there is a possibility of increasing the pressure loss in the casing.

Patent Document 1 discloses that, by disposing a splitter unit inside a flow path in a diffuser, the compressed air is divided into two flows and supplied to a space in a casing.

CITATION LIST

Patent Literature

[Patent Document 1] Japanese Unexamined Patent Application, First Publication No. 2010-223223

SUMMARY OF INVENTION

Technical Problem

Meanwhile, in the case of disposing the splitter unit inside the flow path in the diffuser as in Patent Document 1, it is required to enlarge a diameter of the flow path of the diffuser at a portion where the splitter unit is disposed. When the diameter of the flow path (diffuser) in the diffuser is enlarged, there is a possibility that a boundary layer may be separated from an inner wall surface of the diffuser and pressure loss in the casing may increase.

In addition, in the case of disposing the splitter unit inside the flow path in the diffuser as in Patent Document 1, since it is difficult to sufficiently reduce a flow rate of the compressed gas, there is a possibility that pressure loss in the casing may increase.

Therefore, it is an object of the present invention to provide a gas turbine which can inhibit pressure loss from being reduced in a casing.

Solution to Problem

In order to solve the above problems, a gas turbine according to one aspect of the present invention includes a compressor which compresses gas to generate compressed gas, a casing in which a space is formed, a combustor which is disposed in the space of the casing and generates combustion gas using the compressed gas, a turbine which is provided downstream from the combustor and is driven by the combustion gas, a diffuser which connects an outlet of the compressor and an entrance of the casing, is gradually enlarged in diameter from the outlet of the compressor toward the entrance of the casing, and defines a flow path that guides the compressed gas to the space, a flow guide provided on an outlet side of the diffuser in the space formed in the casing, and a rotor disposed from the compressor to the turbine. The flow guide includes a first guide surface which is provided on the rotor side and delays turning of a flow direction of the compressed gas that has passed through the diffuser, and a second guide surface which is disposed outside the first guide surface and turns the flow direction of the compressed gas that has passed through the diffuser.

According to the present invention, by providing the flow guide having the first and second guide surfaces on the outlet side of the compressor in the space formed in the casing, it is possible to delay turning of the compressed gas whose flow rate has been reduced by the diffuser. Moreover, it is possible to cause a portion in the casing provided with the flow guide to serve as a diffuser. That is, a length of a portion serving as the diffuser can be increased.

As a result, since it is possible to sufficiently reduce the flow rate of the compressed gas flowing into the space in the casing, pressure loss in the casing can be reduced.

Also, in the gas turbine according to one aspect of the present invention, a leading edge of the flow guide may be disposed downstream from an outlet of the diffuser.

In this way, by disposing the leading edge of the flow guide downstream from the outlet of the diffuser, the entire flow guide can be disposed in the space formed in the casing.

Also, in the gas turbine according to one aspect of the present invention, the leading edge of the flow guide may be disposed at a position which coincides with the outlet of the diffuser or at a position upstream from the outlet of the diffuser.

In this way, by disposing the leading edge of the flow guide at the position which coincides with the outlet of the diffuser, or at the position upstream from the outlet of the diffuser, turning of the flow direction of the compressed gas inside the diffuser can be delayed by the first guide surface, and the flow direction of the compressed gas can be turned by the second guide surface.

Also, in the gas turbine according to one aspect of the present invention, the first guide surface may be parallel to an axis of the rotor.

In this way, by making the first guide surface parallel to the axis of the rotor, turning of the compressed gas flowing along the first guide surface can be delayed.

Also, in the gas turbine according to one aspect of the present invention, the first guide surface may be inclined in a direction approaching the axis of the rotor from the leading edge toward a trailing edge of the flow guide.

In this way, by inclining the first guide surface in the direction approaching the axis of the rotor from the leading edge toward the trailing edge of the flow guide, turning of the compressed gas can be further delayed as compared with a case in which the first guide surface is set to be parallel to the axis of the rotor.

Also, in the gas turbine according to one aspect of the present invention, the second guide surface may be a curved surface which curves in a direction going away from the axis of the rotor from the leading edge toward the trailing edge of the flow guide.

In this way, by using the curved surface, which curves in the direction going away from the axis of the rotor from the leading edge toward the trailing edge of the flow guide, as the second guide surface, turning of the compressed gas flowing along the second guide surface can be smoothly performed.

Also, in the gas turbine according to one aspect of the present invention, the diffuser may include a first tubular portion, and a second tubular portion which is disposed outside the first tubular portion and defines the flow path between the first tubular portion and the diffuser, and the flow guide may have an annular shape, and may include a plurality of struts which connect the first tubular portion and the second tubular portion in a radial direction of the rotor, are disposed in a circumferential direction of the rotor, and support the flow guide.

By having the plurality of struts configured in this way, the flow guide can be disposed at a predetermined position with respect to the flow path formed between the first tubular portion and the second tubular portion.

Also, in the gas turbine according to one aspect of the present invention, shapes of the plurality of struts may be blade shapes.

In this way, by making the shapes of the plurality of struts into blade shapes, the compressed gas can be efficiently passed in a direction from leading edges to trailing edges of the plurality of struts.

Also, in the gas turbine according to one aspect of the present invention, the plurality of struts may be disposed to partially overlap the combustor in the circumferential direction of the rotor, and inner sides of leading edge portions of the plurality of struts may be inclined to form an acute angle with respect to the axis of the rotor.

In this way, by inclining the inner sides of the leading edge portions of the plurality of struts to form an acute angle with respect to the axis of the rotor, it is possible to inhibit a local pressure increase on the outlet side of the diffuser due to influence of a potential at leading edges of the plurality of struts. Thus, since it is possible to reduce the flow rate of the compressed gas which flows into the space in the casing, pressure loss in the casing can be inhibited.

Also, in the gas turbine according to one aspect of the present invention, the first tubular portion may include an outer circumferential surface facing the second tubular portion, the second tubular portion may include an inner circumferential surface facing the first tubular portion, and a first angle formed by the axis of the rotor and the outer circumferential surface may be smaller than a second angle formed by the axis of the rotor and the inner circumferential surface.

In this way, by making the first angle formed by the axis of the rotor and the outer circumferential surface of the first tubular portion smaller than the second angle formed by the axis of the rotor and the inner circumferential surface of the second tubular portion, a turning angle of the compressed gas flowing along the first guide surface can be reduced.

In addition, since it is possible to increase a cross-sectional area of the flow path in the diffuser by making the second angle larger than the first angle, the function of the diffuser (specifically, the function of converting the dynamic pressure of the compressed gas into a static pressure) can be enhanced.

Advantageous Effects of Invention

According to the present invention, pressure loss in the casing can be reduced.

DESCRIPTION OF EMBODIMENTS

Hereinafter, an embodiment to which the present invention is applied will be described in detail with reference to the drawings.

First Embodiment

Figure 1:
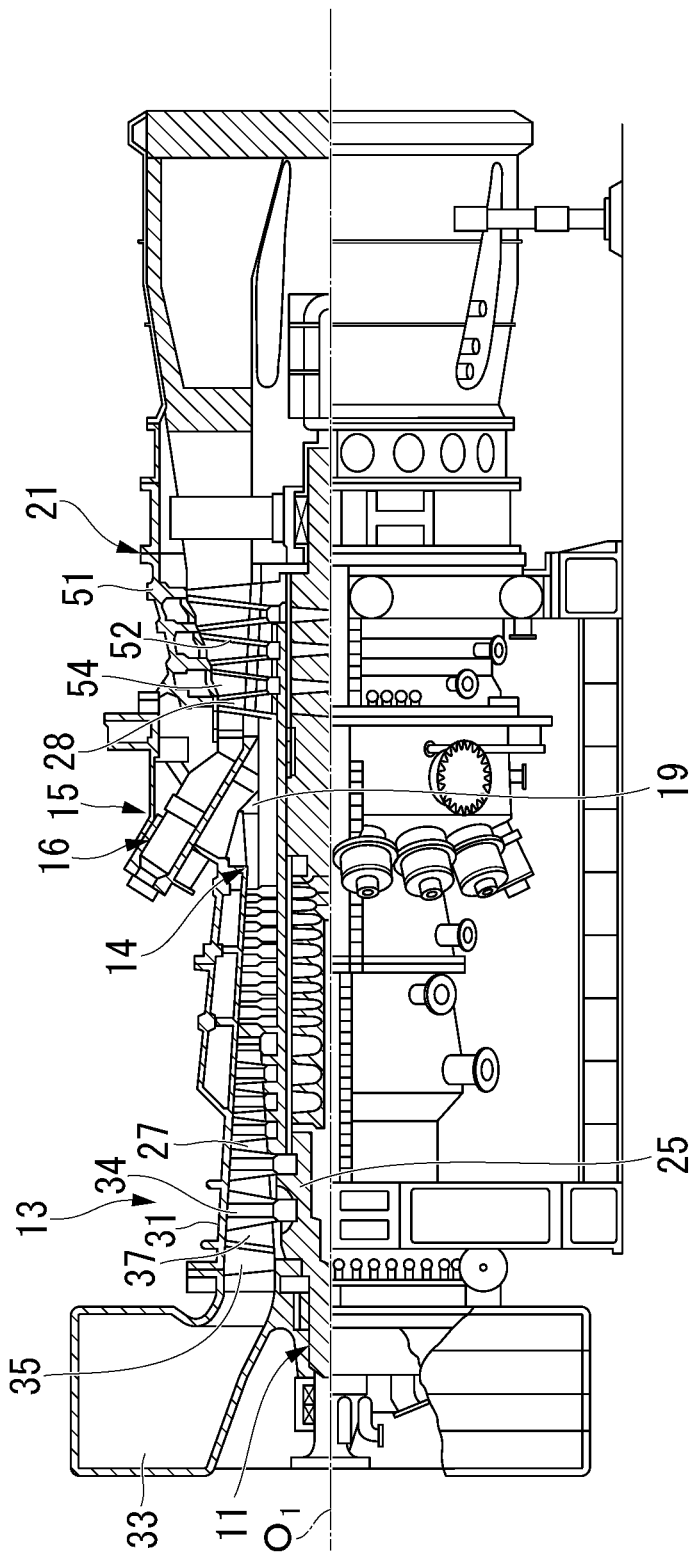
FIG. 1 is a diagram showing a schematic configuration of a gas turbine according to a first embodiment of the present invention.
Figure 2:
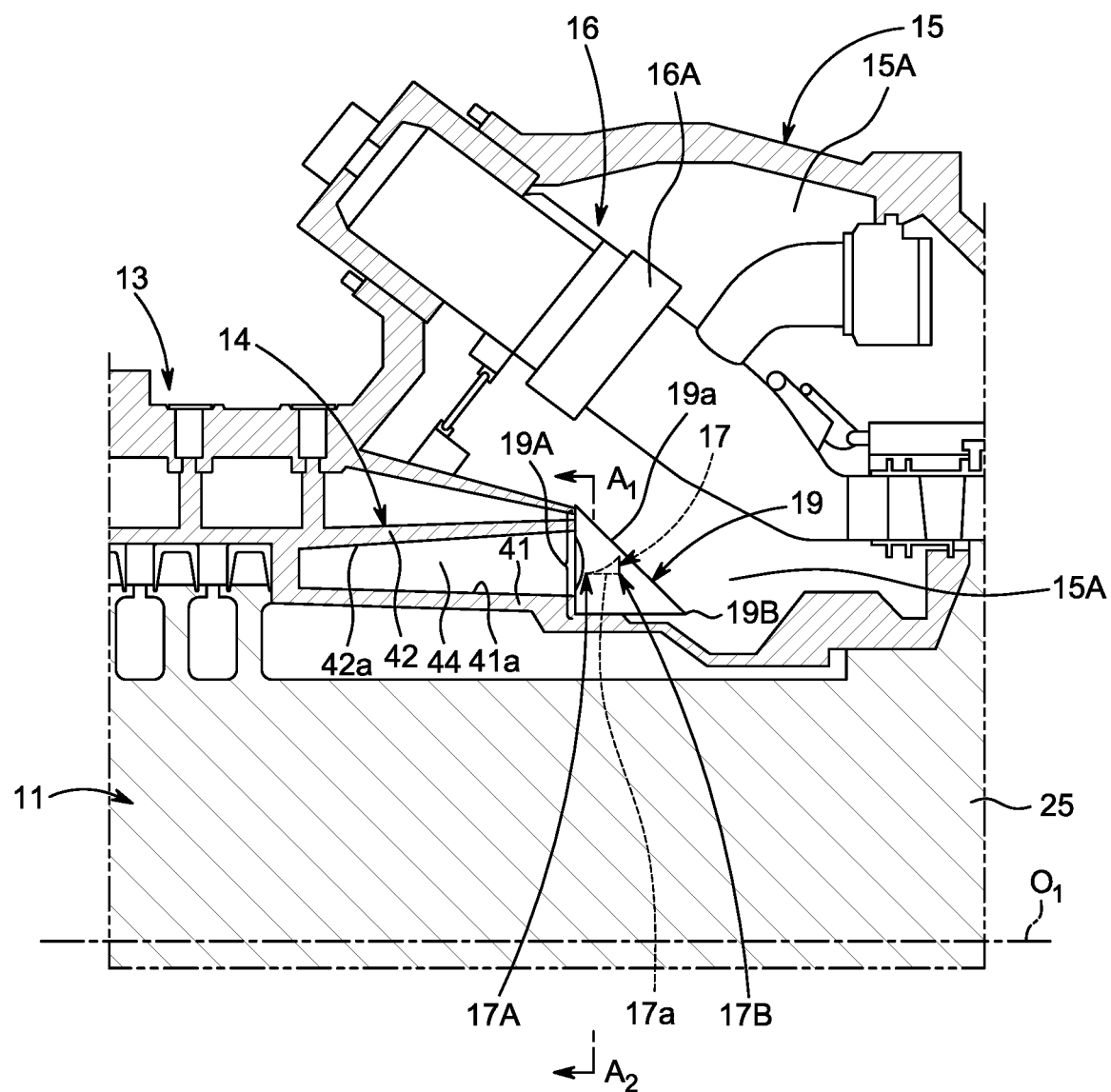
FIG. 2 is an enlarged view showing a portion of the gas turbine shown in FIG. 1 corresponding to a diffuser, a combustor, and a casing that houses the combustor.
Figure 3:
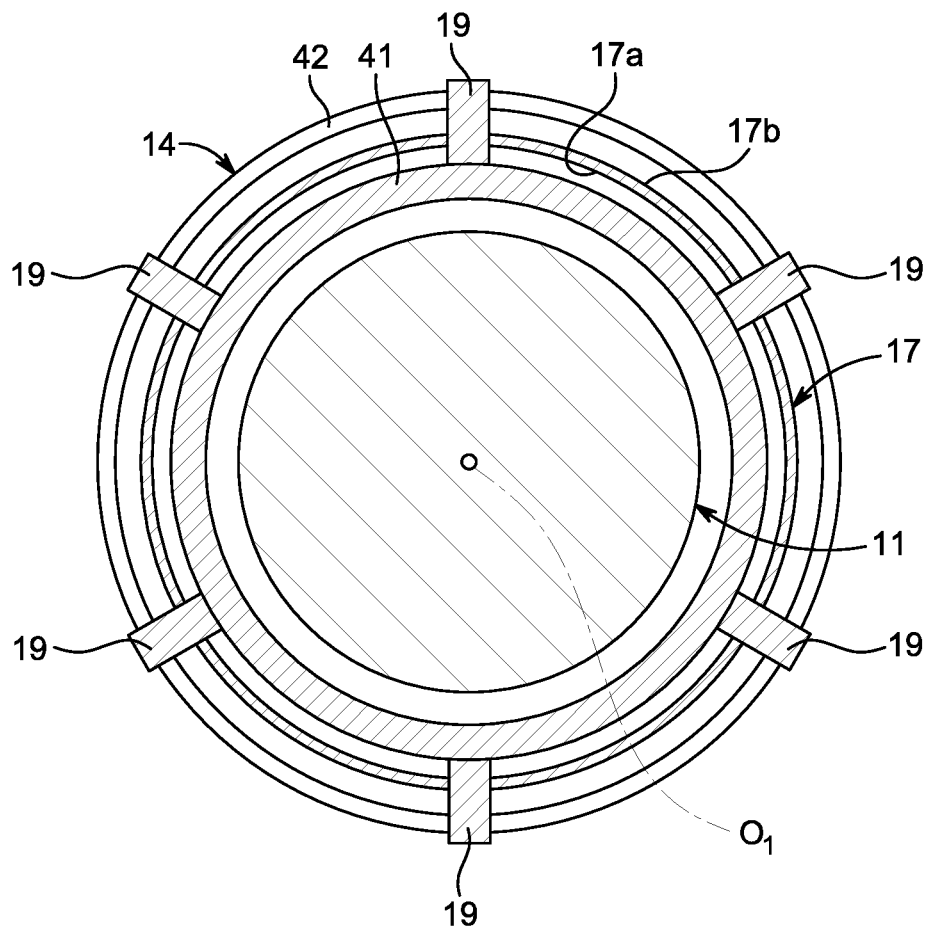
FIG. 3 is a cross-sectional view showing a structure shown in FIG. 2 taken along an A1-A2 line direction.

A gas turbine 10 according to a first embodiment will be described with reference to FIGS. 1 to 3. In FIG. 1, a part of an upper half of the gas turbine 10 is shown in cross-section. In FIG. 1, since it is difficult to illustrate a flow guide 17 shown in FIGS. 2 and 3, illustration of the flow guide 17 is omitted. In FIG. 1, $O_1$ indicates an axis of a rotor 11 (hereinafter referred to as an "axis $O_1$").

In FIG. 3, in order to facilitate understanding of shapes of a diffuser 14, the flow guide 17, and a plurality of struts 19, a cross-section of a structure positioned on a side opposite to a structure shown in FIG. 2 is also shown. In FIGS. 1 to 3, the same components are denoted by the same reference signs.

The gas turbine includes the rotor 11, a compressor 13, the diffuser 14, a casing 15, a combustor 16, the flow guide 17, the plurality of struts 19, and a turbine 21. A generator (not shown) is connected to the gas turbine 10 so that power can be generated.

The rotor 11 has a rotor main body 25 and a plurality of blades 27 and 28. The rotor main body 25 extends in one direction and penetrates the compressor 13, the diffuser 14, the casing 15, the combustor 16, and the turbine 21.

The plurality of blades 27 are provided at a portion of an outer circumferential surface of the rotor main body 25 corresponding to the compressor 13. The plurality of blades 27 are arranged in a circumferential direction of the rotor main body 25 and in the axis $O_1$ direction of the rotor 11 (hereinafter referred to as an "axis direction"). The blades 27 arranged in the circumferential direction of the rotor main body 25 constitute blade groups. A part of the rotor main body 25 and the plurality of blades 27 constitute a part of the compressor 13.

The plurality of blades 28 are provided at a portion of the outer circumferential surface of the rotor main body 25 corresponding to the turbine 21. The plurality of rotor blades 28 are arranged in the circumferential direction of the rotor main body 25 and in the axis direction of the rotor 11. The blades 28 arranged in the circumferential direction of the rotor main body 25 constitute blade groups. A part of the rotor main body 25 and the plurality of blades 28 constitute a part of the turbine.

The compressor 13 has a part of the rotor main body 25, the plurality of blades 27, a casing 31, a gas intake port 33, a compressor flow path 34, an inlet guide vane 35, and a plurality of vanes 37.

The casing 31 is provided outside the rotor main body 25 corresponding to a formation area of the compressor 13. The casing 31 partitions the gas intake port 33 and the compressor flow path 34. The gas intake port 33 takes in air, for example.

The compressor flow path 34 is a tubular space disposed downstream of the gas intake port 33, and extends in the same direction as a direction in which the axis $O_1$ extends (hereinafter referred to as the "axis direction"). The inlet guide vane 35 is provided on an entrance side of the compressor flow path 34.

The plurality of vanes 37 are provided on an inner surface of an outer wall of the casing 31. The plurality of vanes 37 disposed in the circumferential direction of the rotor 11 constitute vane groups. A plurality of vane groups are disposed in the axis direction. The blade groups and the vane groups are alternately disposed in the axis direction.

The compressor 13 configured as described above generates high-temperature and high-pressure compressed gas by compressing the gas passing through the compressor flow path 34. The compressed gas is supplied to an entrance side of the diffuser 14.

The diffuser 14 is provided between the compressor 13 and the casing 15. The diffuser 14 connects an outlet side of the compressor 13 and an entrance side of the casing 15.

The diffuser 14 has a first tubular portion 41, a second tubular portion 42, and a flow path 44. The first tubular portion 41 is a tubular member extending in the axis direction. The first tubular portion 41 is disposed to surround the outer circumferential surface of the rotor main body 25. A central axis of the first tubular portion 41 coincides with the axis $O_1$. The first tubular portion 41 has an outer circumferential surface 41a disposed on a side opposite to an inner circumferential surface facing the rotor 11.

The second tubular portion 42 is a tubular member extending in the axis direction. The second tubular portion 42 is disposed to surround the first tubular portion 41 in a state of being spaced apart outward from the first tubular portion 41. A central axis of the second tubular portion 42 coincides with the axis $O_1$.

The second tubular portion 42 has an inner circumferential surface 42a that faces the outer circumferential surface 41a of the first tubular portion 41 in a radial direction of the rotor 11.

The flow path 44 is partitioned by the outer circumferential surface 41a of the first tubular portion 41 and the inner circumferential surface 42a of the second tubular portion 42. The flow path 44 communicates with a space inside the compressor 13 and a space 15A inside the casing 15. The flow path 44 is a tubular flow path. The flow path 44 is gradually enlarged in diameter from the outlet side of the compressor 13 toward the entrance side of the casing 15.

A first angle $\theta_1$ formed by the axis $O_1$ and the outer circumferential surface 41a of the first tubular portion 41 may be smaller than a second angle $\theta_2$ formed by the axis $O_1$ of the rotor 11 and the inner circumferential surface 42a of the second tubular portion 42.

In this way, by making the first angle $\theta_1$ formed by the axis $O_1$ and the outer circumferential surface 41a of the first tubular portion 41 smaller than the second angle $\theta_2$ formed by the axis $O_1$ of the rotor 11 and the inner circumferential surface 42a of the second tubular portion 42, the turning angle of the compressed gas flowing along a first guide surface 17a of the flow guide 17 can be reduced.

In addition, since it is possible to increase a cross-sectional area of the flow path 44 in the diffuser 14 by making the second angle $\theta_2$ larger than the first angle $\theta_1$, the function of the diffuser 14 (specifically, the function of converting the dynamic pressure of the compressed gas into a static pressure) can be enhanced.

The diffuser 14 configured as described above reduces the flow rate of the compressed gas by converting the dynamic pressure of the compressed gas introduced into the flow path 44 into a static pressure.

The casing 15 is provided downstream of the diffuser 14. The space 15A is formed in the casing 15. The compressed gas whose flow rate has been reduced by passing through the diffuser 14 is introduced into an entrance of the space 15A.

The combustor 16 is disposed in the space 15A inside the casing 15 and is supported by the casing 15. The combustor 16 has an attenuation unit 16A such as an acoustic damper or a liner. An outlet side of the combustor 16 is connected to the turbine 21. In the combustor 16, a predetermined fuel is supplied to the compressed gas introduced into the space 15A to be combusted and thus combustion gas is generated. The combustion gas generated by the combustor 16 is introduced into the turbine 21.

Figure 4:
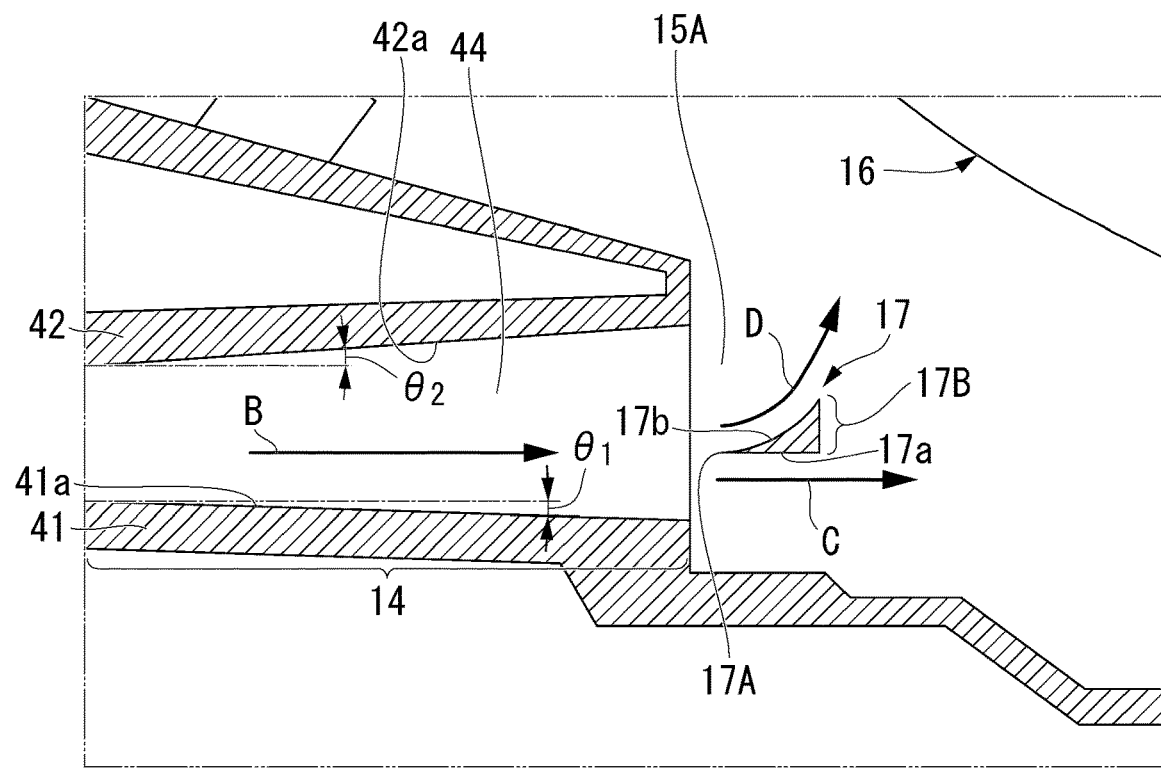
FIG. 4 is an enlarged cross-sectional view showing an outlet side of the diffuser and an entrance side of a space formed in the casing in the structure shown in FIG. 2.

The flow guide 17 will be described with reference to FIGS. 1 to 4. In FIG. 4, for convenience of explanation, illustration of struts 19 shown in FIG. 2 will be omitted.

The flow guide 17 is provided on the outlet side of the diffuser 14 in the space 15A formed in the casing 15. The flow guide 17 is a member formed in an annular shape. The flow guide 17 includes a leading edge 17A.

The flow guide 17 has the first guide surface 17a, a second guide surface 17b, the leading edge 17A disposed on the diffuser 14 side, and a trailing edge 17B disposed on the turbine 21 side.

The first guide surface 17a is a surface disposed on the rotor 11 side. The first guide surface 17a guides a part of the compressed gas which is led out from an outlet of the diffuser 14 and flows in a direction of an arrow B to flow in a direction of an arrow C.

The first guide surface 17a is a guide surface for delaying turning of a flow direction of the compressed gas that has passed through the diffuser 14. Here, in the case of FIG. 4, the turning means changing the flow direction of the compressed gas to an upward direction on the paper.

The first guide surface 17a may be configured to be parallel to the axis $O_1$ of the rotor 11. In this way, by making the first guide surface 17a parallel to the axis $O_1$ of the rotor 11, the turning of the compressed gas flowing along the first guide surface 17a can be delayed.

Figure 7:
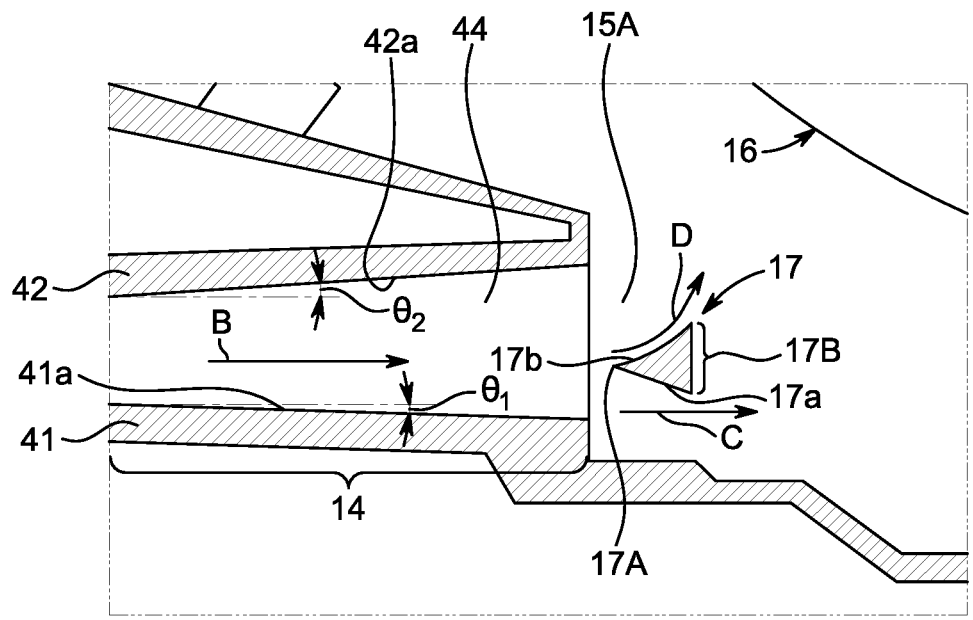
FIG. 7 is an enlarged cross-sectional view of the first embodiment of the present invention in which the first guide surface of the flow guide is schematically shown in an inclined orientation.
Figure 8:
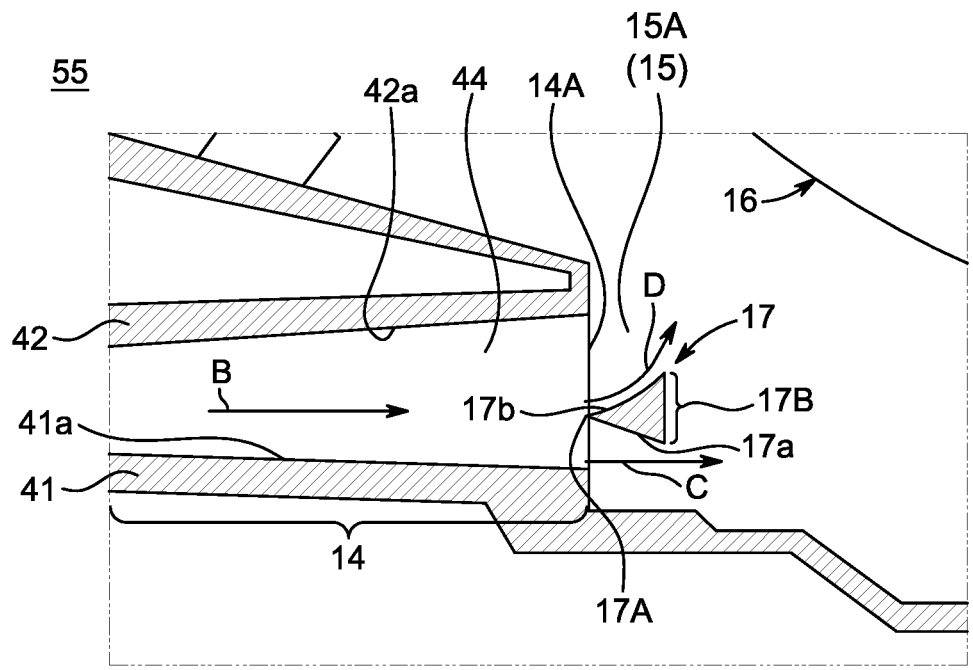
FIG. 8 is a cross-sectional view showing a modified example of the first embodiment of the present invention in which the first guide surface of the flow guide is schematically shown in an inclined orientation.

Further, the first guide surface 17a may be inclined in a direction approaching the axis $O_1$ of the rotor 11 from the leading edge 17A toward the trailing edge 17B of the flow guide 17 (see FIGS. 7 and 8).

In this way, by inclining the first guide surface 17a in the direction approaching the axis $O_1$ of the rotor 11 from the leading edge 17A toward the trailing edge 17B of the flow guide 17, the turning of the compressed gas can be further delayed as compared with the case where the first guide surface 17a is parallel to the axis $O_1$ of the rotor 11.

The second guide surface 17b is disposed outside the first guide surface 17a, and turns the flow direction of the compressed gas that has passed through the diffuser 14 in the radial direction away from the rotor 11 (a direction of an arrow D shown in FIG. 4).

As the second guide surface 17b, for example, it is possible to use a curved surface (a curved surface recessed toward the rotor 11 side) that curves in a direction away from the axis $O_1$ of the rotor 11 from the leading edge 17A toward the trailing edge 17B of the flow guide 17.

In this way, by using the recessed curved surface that curves in the direction away from the axis $O_1$ of the rotor 11 from the leading edge 17A to the trailing edge 17B of the flow guide 17 as the second guide surface 17b, it is possible to smoothly perform turning of the compressed gas flowing along the second guide surface 17b.

The leading edge 17A of the flow guide 17 is disposed downstream from the outlet of the diffuser 14. In this way, by disposing the leading edge 17A of the flow guide 17 downstream from the outlet of the diffuser 14, the entire flow guide 17 can be disposed in the space 15A formed in the casing 15.

Also, the leading edge 17A of the flow guide 17 is disposed downstream from leading edges 19A of the struts 19.

The plurality of struts 19 are provided on the outlet side of the diffuser 14 in the space 15A. The plurality of struts 19 are disposed at intervals in the circumferential direction of the rotor 11.

The rotor 11 side (inner side) of the plurality of struts 19 is connected to the first tubular portion 41. An outer side of the plurality of struts 19 is connected to the second tubular portion 42. Thus, the plurality of struts 19 connect the first tubular portion 41 with the second tubular portion 42 in the radial direction of the rotor 11.

The plurality of struts 19 are disposed to overlap the flow guide 17 in the circumferential direction. Also, the plurality of struts 19 are connected to the flow guide 17 in the circumferential direction.

By having the plurality of struts 19 configured in this way, the flow guide 17 can be disposed (opposed) at a predetermined position with respect to the flow path 44 formed between the first tubular portion 41 and the second tubular portion 42.

Outer surfaces 19a of the plurality of struts 19 are inclined with respect to the axis $O_1$ such that a thickness of the rotor 11 in the radial direction is reduced in a direction from the leading edges 19A toward trailing edges 19B. The leading edges 19A of the plurality of struts 19 are curved surfaces that are recessed in the direction from the leading edges 19A toward the trailing edges 19B.

Shapes of the plurality of struts 19 may be, for example, blade shapes. In this way, by making the shapes of the plurality of struts 19 into the blade shapes, the compressed gas can be efficiently passed therethrough in the direction from the leading edges 19A to the trailing edges 19B of the plurality of struts 19.

Further, the plurality of struts 19 may be configured integrally with the flow guide 17. That is, the plurality of struts 19 and the flow guide 17 may be integrally formed.

In this way, by configuring the plurality of struts 19 and the flow guide 17 integrally, assembling process of the flow guide 17 with respect to the plurality of struts 19 can be omitted.

The turbine 21 includes a part of the rotor main body 25, the plurality of blades 28, a casing 51, a turbine flow path 52, and a plurality of vanes 54.

The casing 51 is provided outside the rotor main body 25. The casing 51 partitions the turbine flow path 52.

The plurality of vanes 54 are provided on an inner surface of an outer wall of the casing 51. The plurality of vanes 54 are disposed in the turbine flow path 52. The plurality of vanes 54 disposed in the circumferential direction of the rotor 11 constitute vane groups. A plurality of vane groups are disposed in the axis direction. The blade groups and the vane groups are alternately disposed in the axis direction.

When the high-temperature and high-pressure combustion gas passes through the plurality of blade groups and vane groups disposed inside the casing 51, the rotor 11 rotates. Thus, a generator (not shown) connected to the rotor 11 generates power.

According to the gas turbine 10 of the first embodiment, by providing the flow guide 17 having the first and second guide surfaces 17a and 17b on the outlet side of the compressor 13 in the space 15A formed in the casing 15, it is possible to delay turning of the compressed gas whose flow rate has been reduced by the diffuser 14, and it is possible to make the portion of the casing 15 provided with the flow guide 17 function as the diffuser 14. That is, a length of the portion functioning as the diffuser can be lengthened.

As a result, since it is possible to sufficiently reduce the flow rate of the compressed gas flowing into the space 15A in the casing 15, pressure loss in the casing can be reduced.

Also, arranged positions, shapes, and sizes of the first and second guide surfaces 17a and 17b may be configured such that, for example, the flow direction of the compressed gas guided to the first guide surface 17a and the flow direction of the compressed gas guided to the second guide surface 17b avoid the attenuation unit 16A of the combustor 16.

Modified Example of First Embodiment

Figure 5:
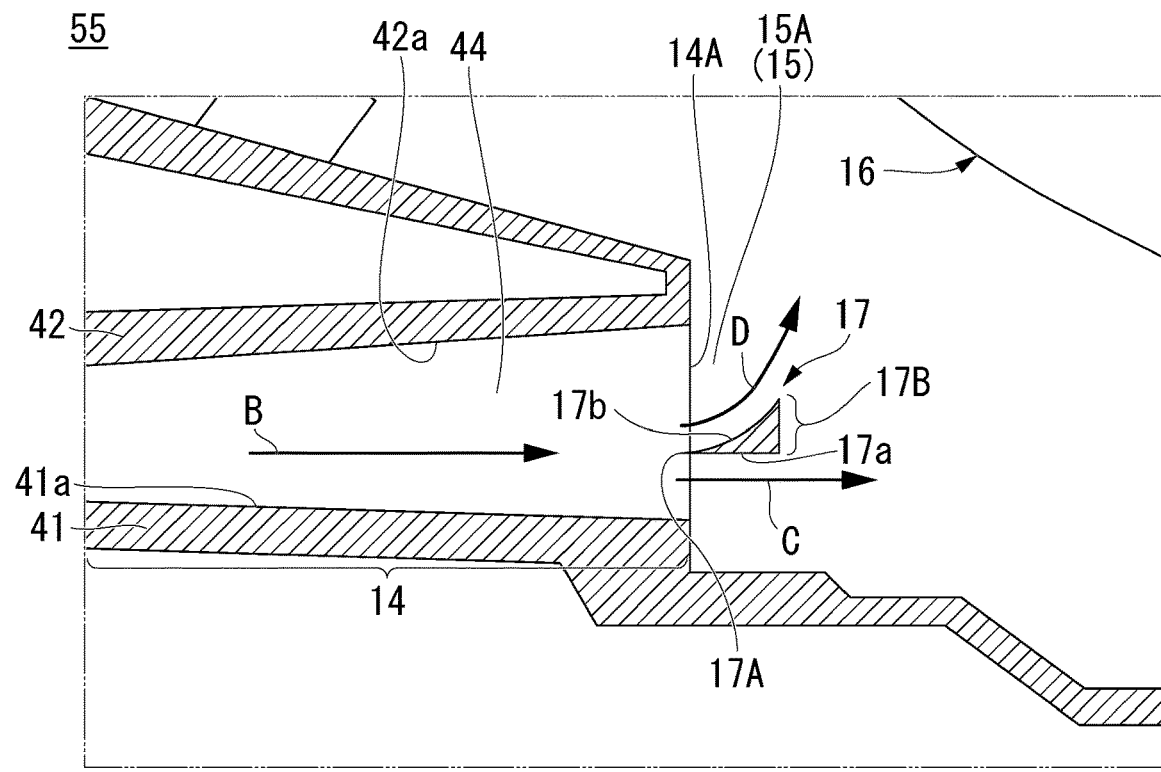
FIG. 5 is a cross-sectional view showing a main part of a gas turbine according to a modified example of the first embodiment of the present invention.

A gas turbine 55 according to a modified example of the first embodiment will be described with reference to FIG. 5. In FIG. 5, the same components as those of the structure shown in FIG. 4 are denoted by the same reference signs.

The gas turbine 55 according to the modified example of the first embodiment is configured in the same manner as the gas turbine 10 of the first embodiment, except that the leading edge 17A of the flow guide 17 is disposed upstream from an outlet 14A of the diffuser 14.

According to the gas turbine 55 according to the modified example of the first embodiment, by disposing the leading edge 17A of the flow guide 17 upstream from the outlet 14A of the diffuser 14, the compressed gas can be separated into a compressed gas turning of the flow direction of which is delayed by the first guide surface 17a and a compressed gas the flow direction of which is turned by the second guide surface 17b before the compressed gas flows out of the diffuser 14. Accordingly, it is possible to further reduce a loss due to the separation or the like downstream from the outlet 14A of the diffuser 14.

Also, although a case where the leading edge 17A of the flow guide 17 is disposed upstream from the outlet 14A of the diffuser 14 has been illustrated as an example in FIG. 5, for example, the position of the outlet 14A of the diffuser 14 and the position of the leading edge 17A of the flow guide 17 may coincide with each other.

In this case, the same effects as those of the case where the leading edge 17A of the flow guide 17 is disposed upstream from the outlet 14A of the diffuser 14 can be obtained.

Second Embodiment

Figure 6:
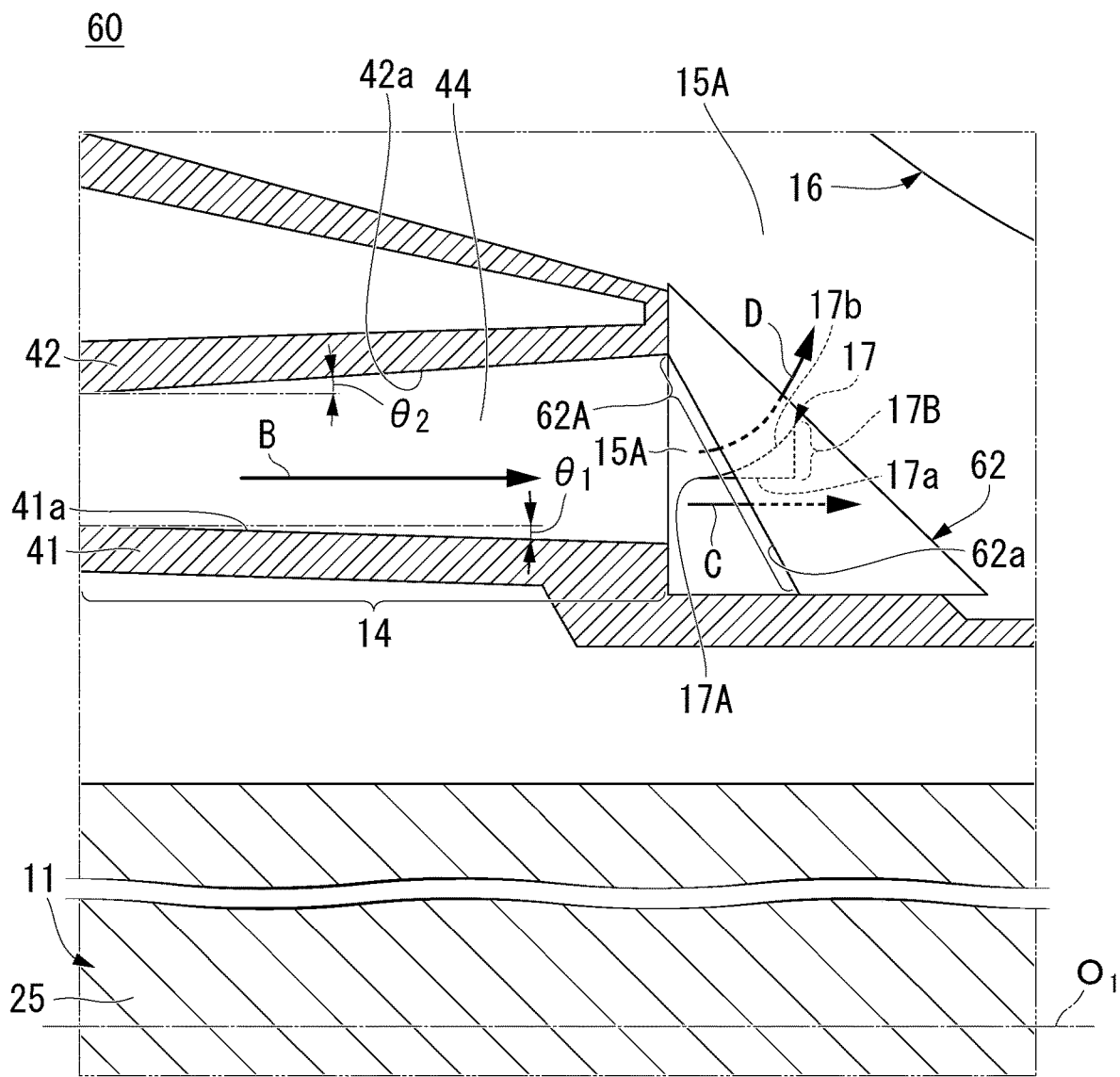
FIG. 6 is a cross-sectional view showing a main part of a gas turbine according to a second embodiment of the present invention.

A gas turbine 60 according to a second embodiment will be described with reference to FIG. 6. FIG. 6 is an enlarged cross-sectional view showing a portion corresponding to the outlet side of the diffuser 14, the flow guide 17, and struts 62 in the upper half of the gas turbine 60. In FIG. 6, the same components as those of the structure shown in FIGS. 1 to 4 are denoted by the same reference signs.

The gas turbine 60 is configured in the same manner as the gas turbine 10 except for having a plurality of struts 62 instead of the plurality of strut 19 constituting the gas turbine 10 of the first embodiment.

The plurality of struts 62 are disposed to partially overlap the combustor 16 in the circumferential direction of the rotor 11. Inner sides of leading edges 62A of the plurality of struts 62 are inclined to form acute angles with respect to the axis $O_1$ of the rotor 11. That is, the angle formed by each of end faces 62a of the leading edges 62A of the plurality of struts 62 and the axis $O_1$ of the rotor 11 is an acute angle. The struts 62 are different from the struts 19 described in the first embodiment in this point.

Shapes of the plurality of struts 62 are preferably shapes with a smooth curvature, for example.

Specifically, as the shapes of the plurality of struts 62, for example, blade shapes can be used. The end faces 62a of the plurality of struts 62 may be recessed in the direction of the axis $O_1$ toward the downstream side.

According to the gas turbine 60 of the second embodiment, by inclining the inner sides of the leading edges 62A of the plurality of struts 62 to form acute angles with respect to the axis $O_1$ of the rotor 11, it is possible to inhibit a local pressure increase on the outlet side of the diffuser 14 due to the influence of the potential at the leading edges 62A of the plurality of struts 62. Thus, since it is possible to reduce the flow rate of the compressed gas flowing into the space 15A inside the casing (inside the casing 15 shown in FIG. 2), pressure loss in the casing 15 can be inhibited.

It should be understood that the preferred embodiments of the present invention have been described in detail above, but the present invention is not limited to such specific embodiments and various modifications and changes are possible within the scope of the gist of the present invention described in the claims.

In the first and second embodiments, for example, in the case where a cavity protruding to an inner diameter side or an outer diameter side of the diffuser 14 is provided downstream from the outlet of the diffuser 14, the leading edge 17A of the flow guide 17 may be disposed downstream from the cavity.

INDUSTRIAL APPLICABILITY

The present invention is applicable to gas turbines.

REFERENCE SIGNS LIST 10, 55, 60 Gas turbine
11 Rotor
13 Compressor
14 Diffuser
14A Outlet
15 Casing
16 Combustor
16A attenuation unit
17 Flow guide
17a First guide surface
17b Second guide surface
17A, 19A, 62A Leading edge
17B, 19B Trailing edge
19, 62 Strut
19a Outer surface
21 Turbine
25 Rotor main body
27, 28 Blade
31, 51 Casing
33 Gas intake port
34 Compressor flow path
35 Inlet guide vane
37, 54 Vane
41 First tubular portion
41a Outer circumferential surface
42 Second tubular portion
42a Inner circumferential surface
44 Flow path
52 Turbine flow path
62a End face
B, C, D Direction
$O_1$ Axis
$\theta_1, \theta_2$ Angle

The invention claimed is:
1. A gas turbine comprising:
a compressor which compresses gas to generate a compressed gas;
a casing in which a space is formed;
a combustor which is disposed in the space of the casing and generates a combustion gas using the compressed gas;
a turbine which is provided downstream from the combustor and is driven by the combustion gas;
a diffuser which connects an outlet of the compressor and an entrance of the casing, is gradually enlarged in diameter from the outlet of the compressor toward the entrance of the casing, and defines a flow path that guides the compressed gas to the space;
a flow guide provided on an outlet side of the diffuser in the space formed in the casing; and
a rotor disposed from the compressor to the turbine,
wherein the flow guide has an annular shape, and includes:
a first guide surface which is provided on a rotor side and delays turning of a flow direction of the compressed gas that has passed through the diffuser; and
a second guide surface which is disposed outside the first guide surface and turns the flow direction of the compressed gas that has passed through the diffuser, wherein the first guide surface is inclined in a direction approaching an axis of the rotor from the leading edge toward a trailing edge of the flow guide, and wherein a leading edge of the flow guide is disposed downstream from an outlet of the diffuser or the leading edge of the flow guide is disposed at a position which coincides with the outlet of the diffuser.

2. The gas turbine according to claim 1, wherein the second guide surface is a curved surface which curves in a direction going away from the axis of the rotor from the leading edge toward the trailing edge of the flow guide.

3. The gas turbine according to claim 1, wherein the diffuser includes a first tubular portion, and a second tubular portion which is disposed outside the first tubular portion and the flow path is defined between the first tubular portion and the second tubular portion, and a plurality of struts, which connect the first tubular portion and the second tubular portion in a radial direction of the rotor, are disposed in a circumferential direction of the rotor, and support the flow guide.

4. The gas turbine according to claim 3, wherein shapes of the plurality of struts are blade shapes.

5. The gas turbine according to claim 3, wherein the plurality of struts are disposed so as to partially overlap the combustor in the circumferential direction of the rotor, and inner sides of leading edge portions of the plurality of struts are inclined to form acute angles with respect to the axis of the rotor.

6. The gas turbine according to claim 3, wherein the first tubular portion includes an outer circumferential surface facing the second tubular portion, the second tubular portion includes an inner circumferential surface facing the first tubular portion, and a first angle formed by the axis of the rotor and the outer circumferential surface is smaller than a second angle formed by the axis of the rotor and the inner circumferential surface.

* * * * *